United States Patent
Kirsten

(10) Patent No.: US 7,149,073 B2
(45) Date of Patent: Dec. 12, 2006

(54) ELECTROCERAMIC COMPONENT

(75) Inventor: Lutz Kirsten, Deutschlandsberg (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/485,060

(22) PCT Filed: May 27, 2002

(86) PCT No.: PCT/DE02/01937

§ 371 (c)(1),
(2), (4) Date: Jul. 21, 2004

(87) PCT Pub. No.: WO03/012808

PCT Pub. Date: Feb. 13, 2003

(65) Prior Publication Data

US 2004/0246656 A1    Dec. 9, 2004

(30) Foreign Application Priority Data

Jul. 26, 2001    (DE) ................. 101 36 545

(51) Int. Cl.
*H01G 4/06*    (2006.01)
(52) U.S. Cl. ............... 361/321.2; 361/321.4; 361/321.5; 361/311; 361/313; 361/306.3; 501/136; 501/137; 501/138
(58) Field of Classification Search ......... 361/321.2, 361/321.5, 321.4, 320, 306.1, 306.3, 321.1, 361/311–313, 306.2; 501/136–138
See application file for complete search history.

(56) References Cited

U.S. PATENT DOCUMENTS

| | | |
|---|---|---|
| 4,027,209 A | 5/1977 | Maher |
| 4,135,224 A * | 1/1979 | Maher ............... 361/321.4 |
| 4,628,404 A * | 12/1986 | Yokoe et al. ......... 361/321.4 |
| 4,640,905 A | 2/1987 | Brun |
| 5,629,252 A | 5/1997 | Nishimoto et al. |

FOREIGN PATENT DOCUMENTS

| | | |
|---|---|---|
| DE | 36 88 098 | 7/1993 |
| DE | 196 53 792 | 6/1998 |
| DE | 100 42 359 | 3/2002 |
| WO | WO 98/03446 | 1/1998 |

OTHER PUBLICATIONS

Valant M. et al., "Microwave Ceramics with Permittivity over 400", The 9th Int'l Meeting on Ferroelectricity, Seoul, South Korea, Aug. 24-29, 1997 Abstract Book, P-05-TH-067.

Kania A., "Ag(Nb1-xTax)03 Solid Solutions- Dielectric Properties and Phase Transitions" Phase Transitions, 1983, vol. 3, pp. 131-140.

Valant M. et al., "New High-Permittivity Ag(Nb1-xTax)03 Microwave Ceramics" Part I: Crystal Structures and Phase-Decomposition Relations, J. Am. Ceram. Soc., 82(1), pp. 81-87, 1999.

(Continued)

*Primary Examiner*—Nguyen T. Ha
(74) *Attorney, Agent, or Firm*—Fish & Richardson P.C.

(57) ABSTRACT

An electroceramic component includes a base body, contact layers on the base body, a dielectric layer in the base body that includes a single-phase perovskite ceramic having a composition of $Ag(Nb_{1-x}Ta_x)O_3$, and an electrode layer in the base body containing a precious metal. The electrode layer is sintered with the dielectric layer.

20 Claims, 2 Drawing Sheets

OTHER PUBLICATIONS

Valant M. et al., "New High-Permittivity Ag(Nb1-xTax)03 Microwave Ceramics" Part II: Dielectric Characteristics, *J. Am. Ceram. Soc.*, 82(1), pp. 88-93, 1999.

Chen, R. et al., "Effect of Silver Adding on the Dielectric Properties of Barium Titanate-Based X7R Ceramics", *J. Amer. Ceramic Soc.*, 86(6):1022-1024 (2003).

Kim, G. et al., "Ferroelectric Properties of Silver-Doped Lead Magnesium Tantalate-Lead Titanate Ceramics", *J. Korean Phys. Soc.*, 35:1396-1399 (1999).

Chen, C. et al., "Effect of Silver on the Sintering and Grain-Growth Behavior of Barium Titanate", *J. Amer. Ceramic Soc.*, 83(12):2988-2992 (2000).

Zuo, R. et al., "Effects of Silver Incorporation on the Dielectric and Ferroelectric Properties of PMN-PNN-PZT Ceramics", *Material Research Bulletin*, 36(12):2111-2118 (2001).

Zuo, R. et al., "Influence of Silver Migration on Dielectric Properties and Reliability of Relaxor Based MLCCs", *Ceramics International*, 26:673-676 (2000).

Halder, N. et al., "Effect of Silver Addition on the Dielectric Properties of Barium Titanate Based Low Temperature Processed Capacitors", *Material Research Bulletin*, 34(4):545-550 (1999).

Byrne, T. et al., "Effects of Silver on Barium Titanate as a Function of Stoichiometry", *J. Amer. Ceramics Soc.*, 87(5):875-880 (2004).

Examination Report dated Jun. 15, 2004, in corresponding German Application No. 10136545.4-34.

Translation of relevant sections of German Examination Report dated Jun. 15, 2004, in corresponding German Application No. 10136545.4-34.

Philips Components "Ceramic Capacitors" Jun. 6, 1997.

Taiwan office action for Application No. 91114139; Mar. 23, 2004.

\* cited by examiner

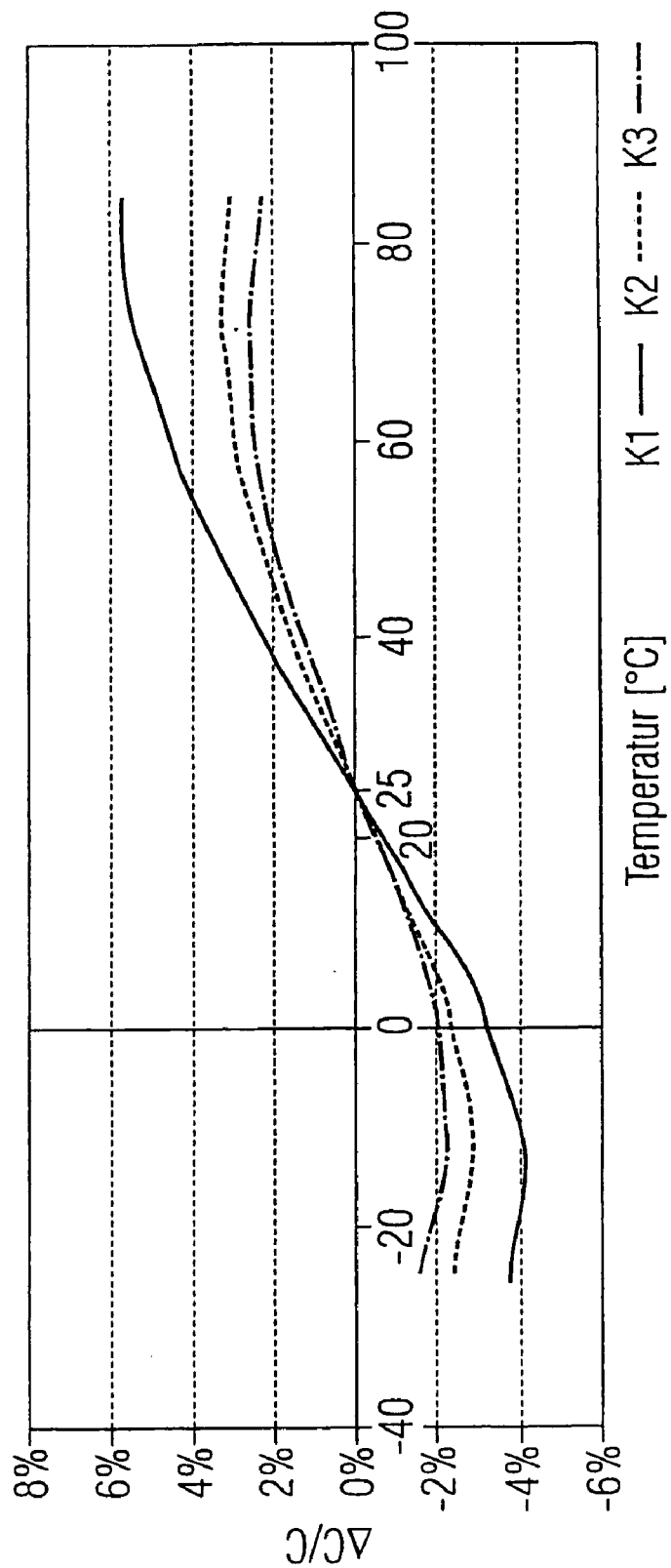

ELECTROCERAMIC COMPONENT

TECHNICAL FIELD

The invention concerns a multilayer capacitor with a base body consisting of a stack of superimposed layers formed from at least one ceramic dielectric layer and one electrode layer and in which the surface of the base body has two contact layers.

BACKGROUND

Multilayer capacitors are known from the publication by M. Valant and D. Suvorov: "Microwave Ceramics with Permittivity over 400," The 9th International Meeting on Ferroelectricity, Seoul, South Korea, 1997, Abstract Book, P-05-TH-067, the dielectric layer of which has a ceramic based on a niobium-based perovskite-type "solid solution" having the general formula $A(B_{1-x}Nb_x)O_3$. It has been found that such ceramics are characterized by a high dielectric constant, $\epsilon = 400$. In addition, these ceramic materials have suitable dielectric properties at low frequencies, between 100 kHz and 1 MHz, so that they are suitable for use in multilayer capacitors.

A ceramic material is known from the publication by A. Kania: "$Ag(Nb_{1-x}Ta_x)O_3$ Solid Solutions—Dielectric Properties and Phase Transitions," Phase Transitions, 1983, Volume 3, pp. 131 through 140, that is produced on the basis of silver, niobium, and tantalum, hereafter called ANT, and is present in the form of a "solid solution" of the two materials $AgNbO_3$ and $AgTaO_3$. The ceramic described in this publication has the composition $Ag(Nb_{1-x}Ta_x)O_3$, called $ANT_x$ in the following, where x can vary between 0 and 0.7. Depending on the composition, this ceramic has an $\epsilon$ between 80 and 400 at a temperature of about 300 K.

It is known from the publication by Matjaz Valant and Danilo Suvorov: "New High-Permittivity $Ag(Nb_{1-x}Ta_x)O_3$ Microwave Ceramics: Part 2, Dielectric Characteristics," J. Am. Ceram. Soc. 82[1], pp. 88–93, (1999), that disk-shaped ceramic bodies of $ANT_x$ with an x-parameter between 0.46 and 0.54 have a strong relative change in the dielectric constant, $\epsilon$, in the temperature range between –20° C. and 120° C. It was shown there, in particular, that the course of the relative change in $\epsilon$ with temperature follows a curve that has a maximum between 20° C. and 70° C. and takes on values between –0.07 and 0.01. The dielectric constant, $\epsilon$, in this case is between 360 and 415, depending on the tantalum content of the ceramic.

Multilayer capacitors are known from the reference DE 196 53 792 A1, in which the dielectric layers consist of various ceramic materials, whereby different temperature coefficients can balance one another. These capacitors have the disadvantage that in order to produce them, a variety of ceramic materials must be created and a higher cost is consequently necessary. On the one hand, the ceramics used for this are based partly on strontium titanate and partly on strontium titanate with alloys (TCC negative). On the other hand, materials with positive temperature coefficients for capacitance based on tantalum oxide manganese titanate are used as dielectrics.

It is also known from the reference WO 98/03446 that by doping ANT with lithium, tungsten, manganese, or bismuth, the temperature coefficient of the dielectric constant, $TC\epsilon$, can be reduced to very small values of ±70 ppm/K° at specific temperatures.

The known multilayer capacitors have the disadvantage that the ceramics used in the capacitor have a relatively small dielectric constant. This has the consequence that in order to produce capacitors with high capacitances, relatively large component sizes are required. This is undesirable due to the advancing miniaturization of electrical components, especially in the cell phone sector.

SUMMARY

The goal of the present invention is therefore to provide a multilayer capacitor that permits high capacitances to be achieved simultaneously with small component sizes.

This goal is reached according to the invention by a multilayer capacitor according to patent claim 1. Advantageous embodiments of the invention and a process for producing the multilayer capacitor can be seen in the other patent claims.

The invention relates to a multilayer capacitor that has a base body. The base body is formed from a stack of superimposed layers. At least one of these layers is a ceramic dielectric layer. At least one other of these layers is an electrically conductive electrode layer. The surface of the base body has two contact layers. One of the dielectric layers has a dielectric constant, $\epsilon$, that is greater than 440.

The following holds true for the capacitance of a plate capacitor:

$$C = \epsilon \cdot \epsilon_0 \cdot A/d$$

where $\epsilon_0$ is the dielectric constant of a vacuum, A is the area of capacitor plates of the plate capacitor, and d is the distance of the capacitor plates from one another. $\epsilon$ is the dielectric constant of a dielectric arranged between the capacitor plates.

Because of the high dielectric constant, $\epsilon > 440$, a higher capacitance, C, can be achieved in the component for the same plate-capacitor area, A, or the same distance between capacitor plates, d. Conversely, the same capacitance, C, can be achieved with the aid of a component that has smaller geometric dimensions, determined by the area, A, of the capacitor plates or by the distance, d, of the capacitor plates from each other.

In an advantageous embodiment of the invention, a dielectric layer contains a perovskite ceramic having the composition $Ag(Nb_{1-x}Ta_x)O_3$. An electrode layer also contains a metallic precious metal. This precious metal can be silver, for example. In addition, the dielectric layers and the electrode layers of the stack of layers forming the base body are sintered together.

Perovskite ceramics of the composition mentioned are described in the state of the art, where exclusively disk-shaped ceramic samples have been described and measured in connection with small dielectric constants. Surprisingly, by constructing a multilayer capacitor and be sintering the perovskite ceramic together in combination with electrode layers containing a precious metal, it can be achieved that the perovskite ceramic has a clearly increased dielectric constant.

It is also advantageous when the following applies in the above-mentioned composition, for the parameter x:

$0.5 \leq 1-x \leq 0.7$.

In this way, the advantage is achieved that the change in the capacitance of the capacitor with the temperature is relatively low.

It is also advantageous for the invention if the number of electrode layers is greater than ten. In the production of various multilayer capacitors, it has been shown that with an increasing number of internal electrodes, the dielectric constant of the capacitor increases further.

In another embodiment of the invention, directly adjacent electrode layers are each in contact with a different electrically conductive contact layer. By this means, a structure of two meshing combs according to the zipper principle arises in regard to the electrode layers, whereby the capacitors formed by two adjacent electrode layers and the dielectric layer between them are connected together in parallel, whereby the capacitance of the multilayer capacitor can be increased.

It is also advantageous if a dielectric layer contains boric acid as a sintering agent to improve its sintering properties.

The invention also provides a process for producing the multilayer capacitor according to the invention, which has the following steps:
 a) Producing a first mixture of $Nb_2O_5$ and $Ta_2O_5$ and calcinating the first mixture to form a precursor,
 b) Mixing $Ag_2O$ and $H_3BO_3$ with the precursor to form a second mixture,
 c) Calcinating the second mixture,
 d) Producing ceramic films from the second mixture,
 e) Superimposing ceramic films and electrode layers,
 f) Sintering the film stacks,
 g) Applying the contact layers.

Of these, steps c) and f) are performed in an atmosphere that has an oxygen content that is higher than that of ambient air. In particular, it is advantageous to perform the steps mentioned in a pure oxygen atmosphere. Performing the process steps in an atmosphere with increased oxygen content, A, has the advantage that the stability of the ceramic produced thereby is increased. The important thing is that all process steps that follow the addition of silver and take place at a temperature higher than room temperature are performed in an atmosphere with increased oxygen content. Increased oxygen content means that containing more oxygen than the approximately 21 vol % oxygen content of air. The oxygen content must therefore be greater than 21%.

Mixing the oxides $Nb_2O_5$ and $Ta_2O_5$ and treating them with heat has the advantage that a mutual diffusion can take place between the various oxides.

It is also advantageous if the ceramic material in the dielectric layer has a single-phase perovskite ceramic as its main component. This has the advantage that the dielectric layer can be produced relatively simply, since, for example, it is not necessary to produce different phases or several ceramic materials.

An example process for producing a multilayer capacitor according to the invention can be seen in the following table:

TABLE 1

| Process step | Purpose | Conditions |
| --- | --- | --- |
| 1st pre-grinding | Production of Nb/Ta precursor from $Nb_2O_5$ and $Ta_2O_5$ | Moist homogenization |
| 1st conversion | Calcination of the Nb/Ta precursor | >1000° C. = air |
| 2nd pre-grinding | Mixing appropriate formulation Ag $(Nb_{0.58}Ta_{0.42})O_3$ | Moist homogenization |
| 2nd conversion | Perovskite calcination | >800° C. - oxygen |
| Fine grinding | Grinding: >2 μm (average distribution) | a: 0.5 mm Y-stabilized $ZrO_2$ beads<br>b: solid-matter content: 50% |
| Film drawing | Films 20 μm thick. | |
| Capacitor construction | First sample evaluation and target construction BF 0805 with 10 nF | Structure for 10 nF: 28 electrodes |

TABLE 1-continued

| Process step | Purpose | Conditions |
| --- | --- | --- |
| Carbon removal/Sintering | Creation of structure | Sintering temperature: >900° C. oxygen |
| Metallization | Contacts to the internal electrode | Air burning |
| Evaluation | Measuring of all electrically relevant data | |

In the following, the invention will be explained in more detail with embodiment examples and the attached figures.

DESCRIPTION OF THE DRAWINGS

FIG. 2 shows the dependency of the relative change in the capacitance of various multilayer capacitors on temperature.

DETAILED DESCRIPTION

Figure 1:
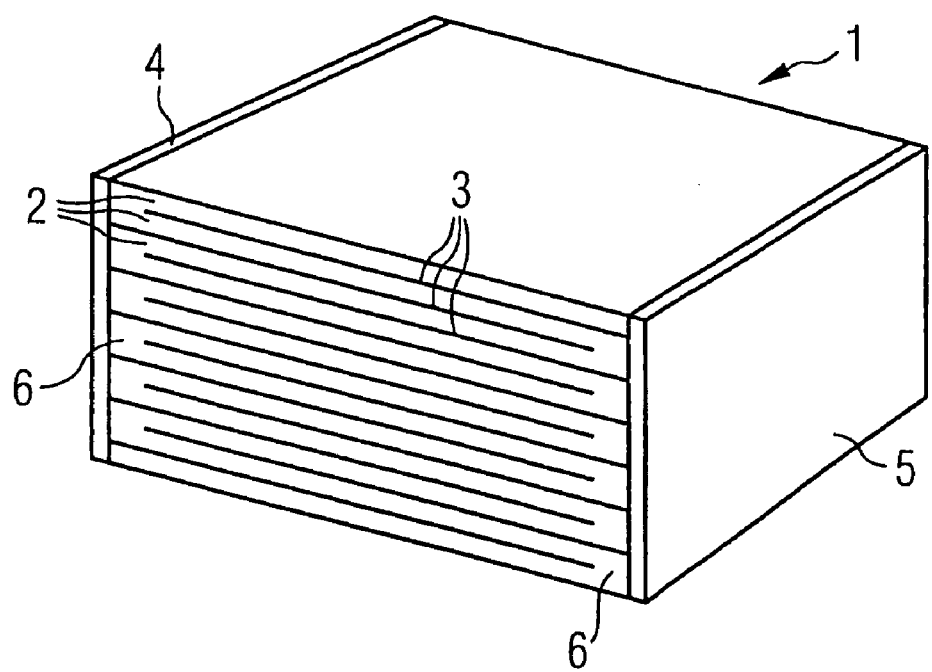
FIG. 1 shows, as an example, a multilayer capacitor in a schematic perspective view.

FIG. 1 shows a multilayer capacitor that contains a stack 1 of superimposed layers 2, 3. In it, dielectric layers 2 alternate with electrode layers 3 in the stack. At opposite outer edges of the layer stack 1, contact layers 4, 5 are applied. FIG. 1 shows a special construction form of a multilayer capacitor with dimensions: length=1.25 mm, width=2 mm, and height=0.8 mm.

The dielectric layers 2 are produced on the basis of a perovskite ceramic having the composition $Ag(Nb_{0.58}Ta_{0.42})O_3$. The example ceramic thus has an x of 0.42. To this ceramic, 1 wt % $H_3BO_3$ was added. The dielectric layers in this case have a thickness of about 14 μm in the sintered state. The electrode layers consist of a paste that contains a mixture of silver and palladium in a weight ratio of Ag/Pd=70/30. A different weight ratio can also be selected. It is only important that the silver content be greater than 60%. The electrode layers are applied to the dielectric layers, which are still in the form of a "green" film at the start of production, in the form of a screen printing paste. The electrode layers have free edges 6 in alternation at their ends adjacent to contact layer 4 or contact layer 5 of the base body 1, at which the electrode layer concerned does not extend all the way to the edge of the layer stack. By this means, each electrode layer 3 is in contact with only one contact layer 4, 5. By this means, there arises a structure of intermeshing combs for the electrode layer 3, whereby the capacitance of the capacitor can be increased.

Each of the contact layers 4, 5 is applied in the form of silver enamel paste to a front surface of the base body 1 of the multilayer capacitor.

Electrical multilayer components with multiple electrode layers have been produced using the perovskite ceramic described in FIG. 1. The number of electrode layers is equal to the number of internal electrodes. Table 2 shows a comparative overview of the electrical properties of such multilayer capacitors. The number of the corresponding sample appears in the first column. In addition, N stands for the number of internal electrodes, C for the capacitance of the capacitor in units of nanofarads, $\epsilon$ for the dielectric constant, tan $\delta$ for the loss factor, $R_{is}$ for the insulation resistance in units of 106 MΩ. ΔC/C stands for the maximum relative change in the capacitance of the capacitor in the temperature range between −25° C. and +25° C., and $\Delta C/C_+$ for the maximum relative change in capacitance in the temperature range between +25° C. and +85° C. Each of these values is given as a percent of the capacitance of the capacitor at +25° C.

TABLE 2

Electrical properties of various multilayer capacitors according to the invention, measured at a frequency of 1 kHz.

| No. | N  | C    | ε   | tan δ  | $R_{is}$ | $\Delta C/C_-$ | $\Delta C/C_+$ |
|-----|----|------|-----|--------|----------|----------------|----------------|
| 1   | 10 | 2.6  | 479 | 0.0138 | 0.005    | −3.8           | 5.2            |
| 2   | 20 | 6.2  | 540 | 0.0006 | 7.2      | −2.7           | 3.2            |
| 3   | 28 | 9.5  | 574 | 0.0005 | 1.9      | −2.2           | 2.6            |
| 4   | 36 | 12.4 | 569 | 0.0005 | 1.3      | −2.3           | 2.6            |

In FIG. 2, the relative change, ΔC/C in capacitance with respect to the capacitance of the capacitor at a temperature of +25° C. is shown in the temperature range between −25° C. and +85° C. for samples 1, 2, and 3. Here, curve K1 relates to sample 1, curve K2 to sample 2, and curve K3 to sample 3.

It has been observed that the temperature dependency of the capacitance becomes weaker as the number of internal electrodes increases (cf. table also). Although the changes measured in capacitors produced according to the exemplary embodiment do not meet the standards of the COG characteristic, according to which the capacitance should change by at most 0.6% in the temperature range from −55° C. to +125° C., capacitors according to the invention have temperature coefficients for capacitance (TCC) that are on the order of magnitude of the COG characteristic.

Experiments show that by sintering the perovskite ceramic that contains silver, niobium, and tantalum together with internal electrodes that contain silver, a significant improvement in the dielectric constant can be achieved. It has also been shown that a further improvement can be achieved by providing as large as possible a contact area between ceramic layers and internal electrodes. Such an increased contact area can be achieved, for example, by an increased number of internal electrodes. But it is equally conceivable that with a constant number of internal electrodes, the area of the base body according to FIG. 1 can be enlarged.

This only involves sintering the ceramic material together with a metallic precious metal, in order to increase the dielectric constant of the ceramic material. The precious metal can be silver, for example.

Advantageous electroceramic components can also be produced without internal electrodes, merely with contact layers arranged on the base body.

The invention claimed is:

1. An electroceramic component comprising:
   a base body;
   contact layers on the base body;
   a dielectric layer in the base body, the dielectric layer being comprised of a single-phase perovskite ceramic having a composition of $Ag(Nb_{1-x}Ta_x)O_3$; and
   an electrode layer in the base body containing a precious metal, the electrode layer being sintered with the dielectric layer.

2. The electroceramic component according to claim 1, wherein the precious metal comprises silver.

3. The electroceramic component of claim 1, wherein the perovskite ceramic contains 0.1–10 wt % boric acid as a sintering aid.

4. The electroceramic component of claim 1, further comprising additional dielectric layers and additional electrode layers, wherein adjacent electrode layers contact different contact layers.

5. The electroceramic component of claim 1, wherein the base body comprises dielectric layers and electrode layers.

6. The electroceramic component of claim 1, wherein the single-phase perovskite ceramic has a composition of $Ag(Nb_{0.58}Ta_{0.42})O_3$.

7. The electroceramic component of claim 1, wherein the single-phase perovskite ceramic contains silver, niobium, and tantalum.

8. A multilayer capacitor comprising:
   a base body formed from a stack of superimposed layers, the superimposed layers comprising a dielectric layer and an electrode layer, the dielectric layer having a dielectric constant that is greater than 440 at standard room temperature; and
   two contact layers on the base body.

9. The multilayer capacitor according to claim 8, wherein the dielectric layer and the electrode layer are sintered together, the dielectric layer contains a perovskite ceramic having a composition of $Ag(Nb_{1-x}Ta_x)O_3$, and the electrode layer contains a precious metal.

10. The multilayer capacitor according to claim 9, wherein $0.5 \leq 1-x \leq 0.7$.

11. The multilayer capacitor according to claim 9, wherein the perovskite ceramic contains 0.1–10 wt % boric acid as a sintering aid.

12. The multilayer capacitor according to claim 9, wherein the precious metal comprises silver.

13. The multilayer capacitor of claim 9, wherein the perovskite ceramic has a composition of $Ag(Nb_{0.58}Ta_{0.42})O_3$.

14. The multilayer capacitor according to claim 8, wherein the superimposed layers comprise greater than ten electrode layers.

15. The multilayer capacitor according claim 8, wherein the superimposed layers comprise plural electrode layers and plural dielectric layers, and wherein each electrode layer is in contact with one of the contact layers such that adjacent electrode layers are in contact with different contact layers.

16. The multilayer capacitor of claim 8, wherein the dielectric layer contains silver, niobium, and tantalum.

17. A method of producing a multilayer capacitor comprised of a base body formed from a stack of superimposed layers and two contact layers on the base body, the superimposed layers comprising a dielectric layer and an electrode layer, the dielectric layer having a dielectric constant that is greater than 440, the method comprising:
   producing a first mixture of $Nb_2O_5$ and $Ta_2O_5$;
   calcinating the first mixture to form a precursor;
   mixing $Ag_2O$ and $H_3BO_3$ with the precursor to form a second mixture;
   calcinating the second mixture;
   producing ceramic films from the second mixture;
   stacking the ceramic films and electrode layers to produce a stack;
   sintering the stack; and
   applying contact layers to the stack;
   wherein calcinating the second mixture, producing ceramic films, stacking the ceramic films, and sintering the stack are performed in an atmosphere that has a higher oxygen content than ambient air.

18. An electroceramic component comprising:
   a base body;
   contact layers on the base body;

a dielectric layer in the base body, the dielectric layer being comprised of a single-phase perovskite ceramic having a composition of $Ag(Nb_{1-x}Ta_x)O_3$; and an electrode layer in the base body containing a precious metal, the electrode layer being sintered with the dielectric layer;

wherein the dielectric layer has a dielectric constant that is greater than 440 at standard room temperature.

19. The electroceramic component of claim 18, wherein the single-phase perovskite ceramic has a composition of $Ag(Nb_{0.58}Ta_{0.42})O_3$.

20. The electroceramic component of claim 18, wherein the single-phase perovskite ceramic contains silver, niobium, and tantalum.

* * * * *